United States Patent [19]

Ferkinhoff et al.

[11] Patent Number: 5,373,456
[45] Date of Patent: Dec. 13, 1994

[54] EXPERT SYSTEM FOR ASSESSING ACCURACY OF MODELS OF PHYSICAL PHENOMENA AND FOR SELECTING ALTERNATE MODELS IN THE PRESENCE OF NOISE

[75] Inventors: David J. Ferkinhoff, New Bedford, Mass.; Kai F. Gong, Pawtucket, R.I.; Kathleen D. Keay, Fairhaven, Mass.; Steven C. Nardone, Narragansett, R.I.

[73] Assignee: The United States of America as represented by the Secretary of the Navy, Washington, D.C.

[21] Appl. No.: 976,349

[22] Filed: Nov. 2, 1992

[51] Int. Cl.$^5$ .............. G01S 7/66; G06F 15/20
[52] U.S. Cl. .................. 364/574; 364/578; 364/516; 382/16; 382/36; 382/37; 382/38; 382/39
[58] Field of Search ........... 364/516, 517, 552, 554, 364/578; 382/39, 36, 37, 38, 25, 16, 10; 356/16, 17, 3; 235/400, 401, 411; 395/50

[56] References Cited

U.S. PATENT DOCUMENTS 5,227,063  1/1992  Nishiya et al. .............. 382/16 PR
5,233,541  8/1993  Corwin et al. .............. 382/39 X
5,258,924 12/1993  Call et al. .............. 364/516 OR Primary Examiner—Ellis B. Ramirez
Assistant Examiner—Kamini S. Shah
Attorney, Agent, or Firm—Michael J. McGowan; Prithvi C. Lall; Michael F. Oglo

[57] ABSTRACT

A system for providing an iterative method of assessing accuracy of selected models of physical phenomena and for determining selection of alternate models in response to a data sequence in the presence of noise. Initially, a residual sequence is generated reflecting difference values between in response to said data sequence and an expected data sequence as would be represented by a selected model. Feature estimate values of a plurality of predetermined data features in the residual sequence are then generated. In response to the feature estimate values, a threshold value is generated for each feature at an estimated ratio of data to noise. Probability values are generated in response to the threshold value, representing the likelihood that the feature exists in the data sequence, does not exist in the data sequence, and that the existence or non-existence in the data sequence is not determinable. Finally, a model is selected in response to the probability values for use during a subsequent iteration.

21 Claims, 5 Drawing Sheets

FIGURE 2

50. PROCESS DATA SEQUENCE BY TRACKING ALGORITHM TO ESTIMATE LIKELY TARGET TRACK

51. GENERATE RESIDUAL VALUES TO REFLECT DIFFERENCE BETWEEN DATA SEQUENCE AND LIKELY TARGET TRACK

52. ESTIMATE REGRESSION FIT TO RESIDUAL VALUES

53. ESTABLISH VALUES OF DETECTION AND FALSE ALARM THRESHOLDS TO PRODUCE PROBABILITIES OF DETERMINING THAT PARTICULAR FEATURES ARE PRESENT IN THE DATA SEQUENCE IN VIEW OF SIGNAL TO NOISE RATIO

54. DETERMINE THE DIFFERENCE BETWEEN THE DETECTION FALSE ALARM VALUES FOR EACH FEATURE TO GENERATE A VALUE REPRESENTING THE LIKELIHOOD THAT THE FEATURE IS PRESENT IN THE DATA

55. DETERMINE THE PROBABILITY THAT A FEATURE IS ABSENT IN THE DATA SEQUENCE

56. DETERMINE THE PROBABILITY THAT THE PRESENCE OR ABSENCE OF A FEATURE IS NOT DETERMINABLE FROM THE DATA SEQUENCE

57. USE THE PROBABILITIES THAT FEATURES ARE PRESENT, ABSENCE OR NOT DETERMINABLE TO SELECT A MODEL

FIGURE 3

70. ESTIMATE SIGNAL TO NOISE RATIO FOR ASSOCIATED SIGNAL FEATURES BY GENERATING A RATIO OF THE ESTIMATE FEATURE MAGNITUDE TO ESTIMATE OF NOISE MAGNITUDE

71. CHARACTERIZE NOISE BY ASSUMING A STATISTICAL DENSITY

72. DETERMINE A THRESHOLD VALUE WHICH REFLECTS THE ESTIMATED SIGNAL TO NOISE RATIO

73. DETERMINE LIKELIHOOD VALUE USING THE THRESHOLD AND THE NOISE CHARACTERISTIC

FIGURE 4

80. DETERMINE VALUES OF PROBABILITY THAT FEATURE IS PRESENT AND THAT FEATURE IS ABSENT IN A REFERENCE SIGNAL

|
|
V

81. DETERMINE DIFFERENCE BETWEEN PROBABILITY VALUES THAT FEATURE IS PRESENT AND ABSENT IN THE REFERENCE SIGNAL

|
|
V

82. DETERMINE PROBABILITY VALUE THAT FEATURE DOES NOT EXIST IN DATA SEQUENCE BY DETERMINING PRODUCT OF FAIL PROBABILITY VALUE AND THE DIFFERENCE BETWEEN PROBABILITY VALUES THAT FEATURE IS PRESENT AND ABSENT IN THE REFERENCE SIGNAL

FIGURE 5

90. DETERMINE PROBABILITY VALUE THAT FEATURE EITHER DOES EXIST OR DOES NOT EXIST IN DATA SEQUENCE BY ADDING PREVIOUSLY-DETERMINED PROBABILITY VALUES INCLUDING PROBABILITY VALUE THAT FEATURE DOES EXIST AND PROBABILITY VALUE THAT FEATURE DOES NOT EXIST

91. DETERMINE PROBABILITY VALUE THAT EXISTENCE OF FEATURE CANNOT BE DETERMINED BY SUBTRACTING SUM FROM UNITY.

EXPERT SYSTEM FOR ASSESSING ACCURACY OF MODELS OF PHYSICAL PHENOMENA AND FOR SELECTING ALTERNATE MODELS IN THE PRESENCE OF NOISE

STATEMENT OF GOVERNMENT INTEREST

The invention described herein may be manufactured by or for the Government of the United States of America for Governmental purposes without the payment of any royalties thereon or therefor.

INCORPORATION BY REFERENCE

J. Baylog, et al., "Underwater Tracking In The Presence of Modeling Uncertainty,"Proc. 21st Assilomar Conference On Signals, Systems And Computers, Nov. 1987, (hereinafter "Baylog, et al.") incorporated by reference.

D. Ferkinhoff, et al., "Feature Extraction And Interpretation For Dynamic System Model Resolution,"- Proc. 24th Assilomar Conference On Circuits, Systems And Computers, Nov. 1990, (hereinafter "Ferkinhoff, et al., I") incorporated by reference.

D Ferkinhoff, et al., "Evidence Generation And Representation For Model Uncertainty Management In Nonlinear State Estimation,"Proc. 25th Assilomar Conference On Circuits, Systems and Computers, Nov. 1991, incorporated by reference.

BACKGROUND OF THE INVENTION (1) Field of the Invention

The invention relates generally to the field of systems and more particularly to system that assesses the accuracy of assumed models of physical phenomena and provides alternate model selections in connection with information concerning the model, in the presence of noise in connection with the information. In a preferred embodiment, the invention facilitates selection of the physical processes relating to motion of a signal source moving in a medium, the propagation of the signal through the medium and the interception of the signal by the sensors being in response to received signals which may be corrupted by noise.

(2) Description of the Prior Art

Expert systems can be used to identify likely models of physical phenomena in response to information about the state of the phenomena, particularly where the information is corrupted by noise. The above-identified Baylog, et al., and Ferkinhoff, et al., I are articles which generally describe a system which is used to model the motion of an object through a fluid in response to information which is received by arrays of acoustic sensors placed in the fluid. The acoustic sensors receive acoustic signals which arise from motion of the object through the fluid, or which may be emitted by the object as it propels itself through the fluid. The particular types-of sensors in the array may be selected to detect certain types of information. For example, sensors may be selected to provide the azimuth bearing of the object relative to the sensor, the angle of depression or elevation of the object relative to the location of the sensor, and the frequency of the signal. Information from these sensors may be used to provide evidence to support models representing the motion of the object through the fluid.

One problem that arises in determining the likelihood that particular models accurately represent physical processes, including the motion of the target object, is that the sensors are likely to receive not only the signals as generated by the moving physical process or object, but also noise. Indeed, noise may be due not only to acoustic signals generated by other objects than the one being modeled, but also by reflections of the signals being generated by the object being modeled off of discontinuities in the fluid, such as off the ocean floor or surface, resulting in multi-path distortion. Depending on the relative levels of the signals and the noise, certain features which are present in the signals which are used to make the determination may be masked by the noise, or at least their detection may be difficult.

SUMMARY OF THE INVENTION

It is therefore an object of the invention to provide a system for providing an enhanced modeling of physical phenomena in response to signals in the presence of noise.

In brief summary, the invention in one aspect provides a system for assessing accuracy of selected models of physical phenomena and for determining selection of alternate models in response to a data sequence in the presence of noise comprising a residual value generator, a feature estimate determination module, a threshold determination module, a feature probability value generator, a model selection module and a control module. The residual value generator generates a residual sequence reflecting difference values between the data sequence and an expected data sequence as would be represented by a selected model. The feature estimate determination module generates feature estimate values of a plurality of predetermined data features in the residual sequence generated by the residual value generator. The threshold determination module generates, in response to the feature estimate values generated by the feature estimate determination module, a threshold value for each feature at an estimated ratio of data to noise. The feature probability value generator generates, in response to the threshold and data noise values, probability values representing the likelihood that the feature exists in the data sequence, does not exist in the data sequence, and that the existence or non-existence in the data sequence is not determinable. The model selection module selects a model or set of models in response to the probability values generated by the feature probability value generator. Finally, the control module controls the operations of the residual value generator, the feature estimate determination module, the threshold determination module, the feature probability value generator and the model selection module in a plurality of iterations, during each iteration the residual value generator module using the model selected by the model selection module during the previous iteration.

In another aspect, the invention provides an iterative method of assessing accuracy of selected models of physical phenomena and for determining selection of alternate models in response to a data sequence in the presence of noise. Initially, a residual sequence is generated reflecting difference values between an in-response-to-the-data-sequence and an expected data sequence as would be represented by a selected model. Feature estimate values of a plurality of predetermined data features in the residual sequence are then generated. In response to the feature estimate values, a threshold value is generated for each feature at an estimated ratio of data to noise. Probability values are generated in response to the threshold and data values representing the likelihood that the feature exists in the data sequence, does not exist in the data sequence, and that the existence or non-existence in the data sequence is not determinable. Finally, a model or set of models are selected in response to the probability values for use during a subsequent iteration.

In yet another aspect, the invention provides a system for use in connection with a computer to assess accuracy of selected models of physical phenomena and for determining selection of alternate models in response to a data sequence in the presence of noise comprising a residual value generator module, a feature estimate determination module, a threshold determination module, a feature probability value generator module, a model selection module, and a control module. The residual value generator module controls the computer to generate a residual sequence reflecting difference values between in response to the data sequence and an expected data sequence as would be represented by a selected model. The feature estimate determination module controls the computer to generate feature estimate values of a plurality of predetermined data features in the residual sequence. The threshold determination module controls the computer to generate, in response to the feature estimate values, a threshold value for each feature at an estimated ratio of data to noise. The feature probability value generator module controls the computer to generate, in response to the threshold and data values, probability values representing the likelihood that the feature exists in the data sequence, does not exist in the data sequence, and that the existence or non-existence in the data sequence is not determinable. The model selection module controls the computer to select a model in response to the probability values. The control module controls the operations of the computer in response to the residual value generator module, the feature estimate determination module, the threshold determination module, the feature probability value generator module and the model selection module in a plurality of iterations. During each iteration, the computer, in response to the residual value generator module, uses the model or set of models selected in response to processing by the model selection module during the previous iteration.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 2 through 5 are flow charts providing an understanding of the target tracking system depicted in FIG. 1.

DETAILED DESCRIPTION OF THE PREFERRED EMBODIMENT

Figure 1:
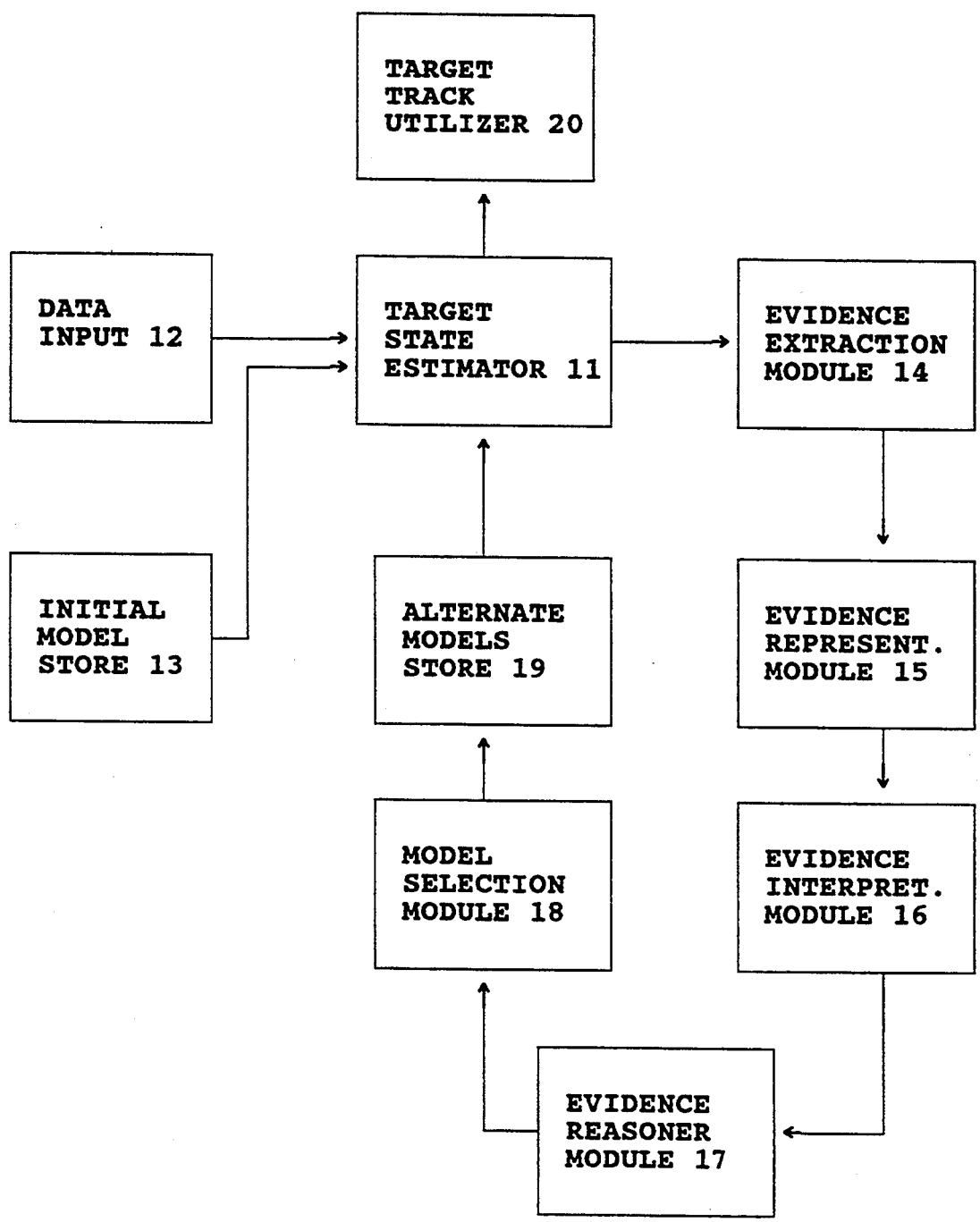
FIG. 1 depicts a functional block diagram of a target tracking system constructed in accordance with the invention.

FIG. 1 depicts a functional block diagram of a target tracking system 10 constructed in accordance with the invention. With reference to FIG. 1, the target tracking system 10 includes a target state estimator module 11 which receives input data from a sensor array through a data input 12 and initially receives an initial target tracking model from an initial model store 13. With respect to one particular embodiment of the target state tracking system, the input data received through the data input represents the values of signals from various acoustic sensors (not shown) which provide an indication of various angular relationships of received acoustic signals with respect to the positions of the sensors and the frequencies of the received acoustic signals. The target state estimator module 11 processes the data representing the signals in connection with an initial tracking model it receives from the initial model store 13 and generates target state estimation data, a by-product of which is the generation of residual values, all of which it provides to an evidence extraction module 14. The initial tracking model received from the initial model store comprises parameter values which represent the values of the data input which would be expected if the target were on a predetermined track in the absence of noise.

The evidence extraction module 14 processes residual values indicating the differences between the target state estimation data and the actual input data, to determine probability values representing the likelihood that selected features that are present in the residual values representing the input data, which are not reflected in the initial tracking model received from the initial model store, which features include, for example, a generally linear drift of the signal, a discontinuity or jump in the signal, or a non-linear or curvature of the signal. The evidence representation module 15 may separately generate these probabilities for data representing each signal from the sensor array (not shown). The evidence representation module 15 generates the probabilities for each feature, and in so doing determines not only the probabilities that such features are present or are not present, but also determines a probability value representing the likelihood that it cannot determine whether a feature exists because of noise in the signal representing fluctuations in the data values.

The probability values for the various features drift, jump and curvature, including the probabilities that the features exist, do not exist and are not determinable, are used by an evidence interpretation module 16, an evidential reasoning module 17 and a model selection module 18 to select alternate tracking model data representing one or more alternate tracking models from an alternate model store 19. The various modules of the target tracking system then repeat the above-described operations using the alternate tracking model parameter values for each of the selected alternate tracking models. The target tracking system 10 performs these operations iteratively, during each iteration the target state estimator module 11 processing the input data in relation to the alternate tracking model data for the alternate tracking models which the model selection module had selected during the previous iteration, until the smallest set of tracking models which produce consistent results is identified. Thereafter, the target state estimator module 11 may provide the identified target tracking models to a utilization device 20, which may utilize the target state information, to, for example, further process the target state information provided by the target state estimator, generate an alarm indication or display the information for an operator (not shown).

The operation of the target tracking system 10 during one iteration will be described in greater detail in connection with the flow charts depicted in FIGS. 2 through 4. With reference first to FIG. 2, as described above the target state estimator module 11 initially processes the input data sequence in relation to the initial tracking model (during the first iteration) or in relation to selected alternate tracking models (during subsequent iterations) to generate target state estimation data (step 50), and in the process thereof generates residual values to reflect the difference between the data sequence and the likely target track (step 51). Thereafter, the evidence extraction module 14 estimates a regression fit of the residual values (step 52). In those operations, if the vector "m" comprises elements ai $$m = [a0, a1, a2] \qquad \text{Eqn. 1}$$

where elements ai ("i" is an index from 0 to k=2) represents regression coefficients associated with each of the features of jump, drift, and curvature, respectively, and reflecting the correlation between the input data sequence, of "n+1" equally-spaced time samples and the expected data sequence as reflected by a particular model, and array B is an (n+1) by (k+1) matrix $$B = [1 \; tq \; tq^{**}2] \qquad \text{Eqn. 2}$$

where tq (index "q" is an integer from zero to "n") represents the values of the "n+1" equally spaced time samples of the input data from the data input 12, and "**2" refers to the squaring function, then the smoothed sequence of residual values, represented by a vector M of "n+1" elements "rq", corresponds to $$M = Bm \qquad \text{Eqn. 3}$$

It will be appreciated that each of the "n+1" elements "rq" of the vector M represents a measure of the difference between the "q-th" time sample input data and the input data which would be represented by the selected model as reflected in the values of the regression coefficients "ai." It will be further appreciated that, although the composite equation consisting of equations Eqn. 1 through Eqn. 3 has been described as having three regression coefficients associated with jump, drift and curvature, respectively, it may be desirable to provide additional regression coefficients, representing higher values of index "k", to obtain unbiased estimates of the residual values for these three features. The additional coefficients may be related to higher-order features which may be present in the input signal data.

After generating the smoothed residual sequence M, the evidence interpretation module 15 and evidential reasoner module 16 use this sequence to establish values of the thresholds to indicate the probability that the particular features are present or are not present in the input data sequence, with the thresholds being determined in relation to the signal to noise ratio for the signal represented by the received input data (step 53). In this operation, which will be described in detail in connection with FIG. 3, the modules first (step 70) determine for each feature a test statistic value li, $$li = [(Mi - M)^{}2]/sigma^{}2 \qquad \text{Eqn. 4}$$

where "(Mi−M)**2" represents the scalar ("dot") product of vectors "M" and "Mi,"

"M" in equation Eqn. 4 represents the vector of "n+1" elements "rq" which is determined in accordance with equation Eqn. 3 including all of the regression coefficients "ai" (equation Eqn. 1), "Mi" in equation Eqn. 4 represents the vector of "n+1 elements "rqi" which is determined in accordance with equation Eqn. 3, except that for vector "m" in equation Eqn. 3 the coefficient "ai" related to the "i-th" feature (index "i" referencing the features jump, drift and curvature) are set to zero, and "sigma" corresponds to a previously-measured standard deviation of noise which may be determined in connection with received reference signals.

The differences between the smoothed residual sequences Mi and M in equation Eqn. 4 provides, for feature "i," a residual value representative of the significance of the "i-th" feature, and thus the test statistic li provides, for that "i-th" feature, an estimate of the signal to noise ratio of the signal represented by the input data. It will be appreciated that the test statistic li, for each feature "i," statistically represents a "chi-squared" variable with one degree of freedom, namely that for the "i-th" feature. It will be recognized by one skilled in the art that the test statistic li is therefore related to the square of a Gaussian random variable (step 71), and the probability distribution in connection with both the elements "rq" of the residual sequence "M" and the elements "rqi" of sequence Mi is essentially the well-known Gaussian distribution or "bell-shaped curve." In the probability distribution, if the "i-th" feature is actually not present, the test statistic "li" would be zero and so the probability distribution would be represented by a Gaussian, or bell-shaped curve, distribution having a zero average value. On the other hand, if the "i-th" feature is present, the Gaussian-shaped probability distribution would have the same "bell-shaped curve" shape, but it would be displaced by an amount corresponding to the square root of the test statistic "li." In one embodiment, the threshold value "ei" for the "i-th" feature is taken as the point at which the presence or absence of the feature is equally likely, which, since the two curves have the same symmetric shape around their respective average values, corresponds to one-half of the distance between their average value:

$$ei = \tfrac{1}{2}[\text{sqrt } (li)] \qquad \text{Eqn. 5}$$

where "sqrt" is the square root function (step 72). The evidence representation module 14 determines the threshold value "ei" for each of the "i" features, using equations Eqn. 4 and Eqn. 5. Since the threshold value "ei" is a function of the test statistic li, which itself is a function of the signal to noise ratio of the input data, the-threshold value itself is a function of the signal to noise ratio of the input data.

After the evidence representation module 15 has determined the threshold value "ei" (step 53) for the "i-th" feature, they use (step 73) that threshold value to determine probability values indicating the likelihood that the feature is present (step 54) and absent (step 55), as well as the probability that the presence or absence of the feature is not determinable from the input data (step 56). The evidence representation module 15 determines the probability "Ppi" that the "i-th" feature is present (step 54), as the difference between a detect probability value Pdi representing the probability that the "i-th" feature is detected given the input data and the particular signal-to-noise ratio, and a fail probability value Pfi, representing the probability that the "i-th" feature is not present given the input data and the particular signal-to-noise ratio. In that operation, module 15 uses the zero-average Gaussian probability distribution determined in step 53 as described above, which reflects the absence of the "i-th" feature, as well as the non-zero [that is, the sqrt (li)] average Gaussian probability distribution, also determined in step 53 as described above, which reflects the presence of the "i-th" feature and the threshold value "ei" in step 53.

In determining both the detect probability value, Pdi, and the fail probability value, Pfi, the evidence representation module 15 uses the regions of the respective Gaussian probability distributions which are beyond zero by an amount corresponding to the threshold value "ei" determined in step 53.

In both cases, the module 15 excludes a portion of the respective probability distributions which are within a region less than the threshold value "ei" around zero. In determining the fail probability value Pfi, the module 15 uses the Gaussian probability distribution which assumes the absence of the feature (that is, the zero-average distribution), and determines the total probability in the region of the distribution which is beyond a zero by amounts more than the threshold "ei." In that determination, modules 15 essentially determines the integral of the Gaussian distribution outside of the threshold.

Similarly, for the detect probability value Pdi, the evidence representation module 15 uses the Gaussian probability distribution which assumes the presence of the feature (that is, the non-zero-average distribution) and determines the total probability value of the portion of the distribution beyond the same values (that is, beyond the threshold values as established with the zero-average distribution).

In both cases, the evidence representation module 15 essentially determines the integral of the Gaussian distributions outside of the threshold regions. The probability that a particular feature is present, as determined in step 54, is the difference between the detect and fail probability values, or $$P{pi} = P{di} - P{fi} \qquad \text{Eqn. 6}$$

which value the evidence representation module 15 determines in step 54.

In determining a probability value Pni reflecting the probability that the "i-th" feature is not present (step 55, shown in greater detail in FIG. 4), the evidence representation module 15 makes use of previously-determined detect and fail probability, Pdr and Pfr, respectively, for a reference signal (steps 80 and 81), as well as the fail probability value determined in step 54. In particular, the probability value Pni makes use of the fail probability value Pfi for the "i-th" feature, as that reflects a probability of failure in the detection of the feature, but scales it by a probability value that the feature would have been detected if it were present. In concert with the equation Eqn. 6, the probability that the feature would have been detected corresponds to the difference between the detect and fail probability values Pdr and Pfr, respectively (step 81). Accordingly, the probability Pni that the "i-th" feature is not present (step 82) corresponds to:

$$P{ni} = (P{dr} - P{fr})P{fi} \qquad \text{Eqn. 7}$$

which value is determined by the evidence representation module 15 in step 55.

Finally, the evidence representation module 15 determines in step 56 (shown in greater detail in FIG. 5), a probability value Pui representing the likelihood that the presence or absence of the "i-th" feature is undetermined. Since all three probabilities must add up to unity, the evidence representation module 15 determines the value of Pui (steps 90 and 91) as:

$$P{ui} = 1 - (P{pi} + P{ni}) \qquad \text{Eqn. 8}$$

which corresponds to:

$$P{ui} = 1 - P{di} + [1 - (P{dr} - P{fr})]P{fi} \qquad \text{Eqn. 9}$$

As noted above, the target tracking system 10 (FIG. 1) operates in a series of iterations. After determining the probability values Ppi, Pni and Pui for all of the "i" features, and for all of the selected models, for a current iteration, the evidence interpretation module 16 and evidential reasoner 17 use the probability values as evidencing one or more of the models which were selected in generating residual values and subsequent regression coefficients "m" as described-above, as well as for providing evidence for other models. Accordingly, they use the probability values generated for each model during a current iteration in enabling the model selection module 18 (FIG. 1) to select one or more models from the plurality of models whose model state information is maintained in the alternate model store 19. The store 19 couples the model state information for the selected model(s) to the target state estimator module 11 for use in a next iteration (step 57).

The target tracking system 10 repeats the operations described above in connection with FIG. 2 through 5 through a series of iterations until it determines-that predetermined termination criteria has been satisfied. In one embodiment the target tracking system 10 terminates operations when it determines that substantially the same models are selected in consecutive iterations. Alternatively, the target tracking system 10 may proceed through a predetermined number of iterations, during each iteration the model selection module 18 selecting models based on predetermined selection criteria relating to the determined probability values. After the iterations have been terminated, the target tracking system 10 enables the target track utilizer 20 to use the model information regarding the finally-selected model(s) as described above.

It will be appreciated that the system 10 may be embodied in a suitably programmed digital computer, or alternatively in special purpose hardware.

The invention provides a number of advantages. Since the system uses probability values representing the likelihood that the various features are present, absent, or that the presence or absence is not determinable, as well as threshold values, based on the signal-to-noise ratio of the input data sequence, it is better able to select models and to and determine the accuracy of a selected model.

The preceding description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A system for assessing accuracy of selected models of physical phenomena and for determining selection of alternate models in response to a data sequence representing a sequence of values of a signal in the presence of noise comprising:

a residual value generator for generating residual data values reflecting difference values in response to the data sequence and an expected data sequence that is generated in response to a selected model;

a feature estimate value generator for generating feature estimate values of a plurality of predetermined data features in the residual sequence generated by the residual value generator;

a threshold value determination element for generating, in response to the feature estimate values generated by the feature estimate value generator, a threshold value for each feature at an estimated ratio of data to noise;

a feature probability value generator for generating, in response to the threshold value, probability values representing the likelihood that the feature exists in the data sequence, does not exist in the data sequence, and that the existence or non-existence in the data sequence is not determinable;

a model selector for selecting a model in response to the probability values generated by the feature probability value generator; and a controller for controlling the operations of residual value generator, the feature estimate value generator, the threshold value determination element, the feature probability value generator and the model selector in a plurality of iterations, during each iteration the residual value generator using the model selected by the model selection module during the previous iteration.

2. A system as defined in claim 1 in which said threshold value determination element includes:

a test statistic value generator for generating, for each feature, a test statistic value in response to a difference between the residual sequence and the residual sequence without regard to the feature, and in further response to a predetermined noise value; and a threshold value generator for generating said threshold value as a function of said test statistic.

3. A system as defined in claim 2 in which said function is selected so that a statistical distribution of the residual values with regard to the feature and the corresponding statistical distribution of the residual values without regard to the feature are the same.

4. A system as defined in claim 1 in which said feature probability value generator includes:

a feature present probability value generator for generating, in response to a statistical distribution function representing a statistical distribution of the residual values with regard to the feature and the corresponding statistical distribution of the residual values without regard to the feature, and the threshold value, a feature present probability value representing a likelihood that the feature is present in the data sequence;

a feature absence probability value generator for generating, in response to the statistical distribution function and the threshold value, a feature absent probability value representing a likelihood that the feature is absent from the data sequence; and a feature indeterminable probability value generator for generating, in response to the feature present probability value and the feature absent probability value, a feature indeterminable probability value representing a likelihood that the presence or absence of the feature in the data sequence is indeterminable.

5. A system as defined in claim 4 in which the feature probability value generator further includes:

a feature detection probability generator for generating a feature detect probability value in response to the statistical distribution function and the threshold value; and a feature detection failure probability generator for generating a feature detection failure probability value in response to the statistical distribution function and the threshold value.

6. A system as defined in claim 5 in which the feature present probability value generator generates said feature present probability value as a difference between the feature detect probability value and the feature detection failure probability value.

7. A system as defined in claim 5 in which the feature detection probability generator and said feature detection failure probability generator further generate a reference feature detect reference probability value and a reference feature detection failure probability value in response to a reference statistical distribution function and a threshold value, the feature absence probability value generator generating the feature absence probability value in response to the reference feature detect reference probability value and a reference feature detection failure probability value and the feature detection failure probability value.

8. A method of assessing accuracy of selected models of physical phenomena and for determining selection of alternate models in response to a data sequence representing value of a signal in the presence of noise, the method comprising the steps of iteratively:

generating a residual sequence reflecting difference values in response to the data sequence and an expected data sequence as would be represented by a selected model;

generating feature estimate values of a plurality of predetermined data features in the residual sequence;

generating, in response to the feature estimate values, a threshold value for each feature at an estimated ratio of data to noise;

generating, in response to the threshold value, probability values representing the likelihood that the feature exists in the data sequence, does not exist in the data sequence, and that the existence or non-existence in the data sequence is not determinable;

selecting a model in response to the probability values for use during a subsequent iteration.

9. A method as defined in claim 8 in which said threshold value generating step includes the steps of:

generating, for each feature, a test statistic value in response to a difference between the residual sequence and the residual sequence without regard to the feature, and in further response to a predetermined noise value; and generating said threshold value as a function of said test statistic.

10. A method as defined in claim 9 in which said function is selected so that a statistical distribution of the residual values with regard to the feature and the corresponding statistical distribution of the residual values without regard to the feature have a selected relationship.

11. A method as defined in claim 8 in which said feature probability value generating step includes the steps of:

for generating, in response to a statistical distribution function representing a statistical distribution of the residual values with regard to the feature and the corresponding statistical distribution of the residual values without regard to the feature, and the threshold value, a feature present probability value representing a likelihood that the feature is present in the data sequence;

generating, in response to the statistical distribution function and the threshold value, a feature absent probability value representing a likelihood that the feature is absent from the data sequence; and generating, in response to the feature present probability value and the feature absent probability value, a feature indeterminable probability value representing a likelihood that the presence or absence of the feature in the data sequence is indeterminable.

12. A method as defined in claim 11 in which the feature probability value generating step further includes the steps of:

generating a feature detect probability value in response to the statistical distribution function and the threshold value; and generating a feature detection failure probability value in response to the statistical distribution function and the threshold value.

13. A method as defined in claim 12 in which the feature present probability value generating step includes the step of generating said feature present probability value as a difference between the feature detect probability value and the feature detection failure probability value.

14. A method as defined in claim 12 in which the feature detection probability generating step and said feature detection failure probability generating step further include the steps of generating a reference feature detect reference probability value and a reference feature detection failure probability value in response to a reference statistical distribution function and a threshold value, the feature absence probability value being generated in response to the reference feature detect reference probability value and a reference feature detection failure probability value and the feature detection failure probability value.

15. A system for use in connection with a computer to assess accuracy of selected models of physical phenomena and for determining selection of alternate models in response to a data sequence representing the value of a signal in the presence of noise comprising:

a residual value generator element for controlling the computer to generate a residual sequence reflecting difference values in response to the data sequence and an expected data sequence as would be represented by a selected model;

a feature estimate value generator element for controlling the computer to generate feature estimate values of a plurality of predetermined data features in the residual sequence;

a threshold value determination element for controlling the computer to generate, in response to the feature estimate values, a threshold value for each feature at an estimated ratio of data to noise;

a feature probability value generator element for controlling the computer to generate, in response to the threshold value, probability values representing the likelihood that the feature exists in the data sequence, does not exist in the data sequence, and that the existence or non-existence in the data sequence is not determinable;

a model selector element for controlling the computer to select a model in response to the probability values; and a controller for controlling the operations of the computer in response to the residual value generator element, the feature estimate value generator element, the threshold value determination element, the feature probability value generator element and the model selector element in a plurality of iterations, during each iteration the computer in response to the residual value generator element using the model selected by the model selector element during the previous iteration.

16. A system as defined in claim 15 in which said threshold value determination element includes:

a test statistic value generator element for controlling the computer to generate, for each feature, a test statistic value in response to a difference between the residual sequence and the residual sequence without regard to the feature, and in further response to a predetermined noise value; and a threshold value generator element for controlling the computer to generate said threshold value as a function of said test statistic.

17. A system as defined in claim 16 in which said function is selected so that a statistical distribution of the residual values with regard to the feature and the corresponding statistical distribution of the residual values without regard to the feature are the same.

18. A system as defined in claim 15 in which said feature probability value generator element includes:

a feature present probability value generator element for controlling the computer to generate, in response to a statistical distribution function representing a statistical distribution of the residual values with regard to the feature and the corresponding statistical distribution of the residual values without regard to the feature, and the threshold value, a feature present probability value representing a likelihood that the feature is present in the data sequence;

a feature absence probability value generator element for controlling the computer to generate, in response to the statistical distribution function and the threshold value, a feature absent probability value representing a likelihood that the feature is absent from the data sequence; and a feature indeterminable probability value generator element for controlling the computer to generate, in response to the feature present probability value and the feature absent probability value, a feature indeterminable probability value representing a likelihood that the presence or absence of the feature in the data sequence is indeterminable.

19. A system as defined in claim 18 in which the feature probability value generator element further includes:

a feature detection probability generator element for controlling the computer to generate a feature detect probability value in response to the statistical distribution function and the threshold value; and a feature detection failure probability generator element for controlling the computer to generate a feature detection failure probability value in response to the statistical distribution function and the threshold value.

20. A system as defined in claim 19 in which the feature present probability value generator element controls the computer to generate said feature present probability value as a difference between the feature detect probability value and the feature detection failure probability value.

21. A system as defined in claim 19 in which the feature detection probability generator element and said feature detection failure probability generator element further control the computer to generate a reference feature detect reference probability value and a reference feature detection failure probability value in response to a reference statistical distribution function and a threshold value, the feature absence probability value generator element controlling the computer to generate the feature absence probability value in response to the reference feature detect reference probability value and a reference feature detection failure probability value and the feature detection failure probability value.

* * * * *